April 10, 1951     A. G. EPPRECHT     2,548,659

TRIPOD

Filed July 30, 1947

Inventor

Alfred G. Epprecht

By

Attorneys

Patented Apr. 10, 1951

2,548,659

UNITED STATES PATENT OFFICE 2,548,659

TRIPOD

Alfred G. Epprecht, Zurich, Switzerland

Application July 30, 1947, Serial No. 764,659
In Switzerland July 30, 1939

5 Claims. (Cl. 248—181)

The usual telescope-like extending tripods for photographic cameras have a disadvantage. They do not permit the taking of photographs in dark rooms unobtrusively. They cannot be used for photographing in confined quarters where only small or narrow sustaining surfaces are at the disposal of the photographer. Besides, the use of these well known extending tripods in public buildings, such as museums, etc., is in many places prohibited.

The object of this present invention is to provide a small compact tripod for supporting optical apparatus, especially photographic cameras, where the above-mentioned disadvantage is overcome.

This result is realized by the provision of a holder in the form of a ball and socket joint for the holding and fastening the photographic apparatus at the top of a pedestal. This pedestal is fitted with three laterally extending supporting feet, of which two at least must be able to swing around the vertical axis, so as to be able to arrange them adjacent each other when not in use, in order that they do not occupy more room than is strictly necessary. This is important for the storing and removing of the tripod especially in those cases where the obtainable space for the sustaining surface is small.

These supporting feet must be moved into a position of a three point support and must be arrested there. The measurements of the tripod must be calculated so that when not in use and folded it may be placed in the coat pocket of the user.

The invention is clearly illustrated in the accompanying drawing in which similar characters of reference are employed throughout the several views and in which:

Figure 1 is an axial section of the tripod,

Figure 2 is a horizontal section on line 2—2 of Figure 1 with the lateral supporting feet folded and with the ball and socket having an angle of deviation of 90%, compared with its position in Figure 1, Figure 3 is a horizontal section on line 3—3 of Figure 1, with the supporting feet moved into supporting position.

In the presented example, Figure 3 shows a hollow cylindrical pedestal 3 provided with an internal thread 13. This pedestal 3 with a laterally extending supporting foot 10 is made of one piece. Two further supporting feet, 4 and 5, are provided at their inner ends with rings 4a and 5a respectively, which are mounted in juxtaposed relation on a hollow winged screw 7, which corresponds with the internal thread 13. They are movably mounted round the axis of the pedestal. The rings 4a and 5a lie between a shoulder 7a of the winged screw 7 and the one adjoining end of the hollow cylindrical pedestal 3.

By this arrangement, the rings are removably clamped as shown in Figure 2 or 3, when the winged screw is drawn tightly. The hollow winged screw 7 surrounds the shank of a further winged screw 8, the enlarged end of which is adjustably engaged with the internal thread 13 of the pedestal 3 at a point above the screw 7.

The wings of the screw 8 consist of a flat iron 16 which is fastened by means of a screw 11 in the slit placed at one end of the screw 8. This arrangement has been made in such a way that the wings of the screw 8 are shorter than the wings of the screw 7.

At the outer face of the enlarged end of the screw 8 there is a bearing ring 6 which serves as a seat for the ball 1 holding the latter in the socket provided at the upper end of the pedestal by the inturned flange 15 which has to serve as an abutment to the ball 1. The ball 1 of the joint is equipped with a pivot 14 and with a screw plate 12 for the attachment and fastening of a photographic camera. A slit 2 is provided in the upper end of the pedestal 3 and enables the moving of the pivot 14 of the joint with ball and socket out of the full line position into the dotted line position in Figure 1. Both the stationary foot 10 and the pedestal 3 are equipped with an angle iron rib 9 serving as a handle. The supporting feet 4, 5 and 10 are placed radially relative to the pedestal 3. They are also, however, somewhat inclined downwardly as shown.

What I claim is:

1. A tripod for supporting photographic apparatus and the like comprising an elongated internally threaded tubular pedestal, means partly within the upper end of the pedestal for attachment to a photographic apparatus, means within the tubular pedestal and including a portion operable from the lower end for clamping the attachment means in a set position at least three supporting feet extending laterally from the lower end of the pedestal and at least two of which are movably mounted on the pedestal so as to form a three point support when in use and being movable into juxtaposed relation with the remaining supporting foot to form a compact unit capable of being carried in the pocket of the user, and means adjustably engageable with the lower inner portion of the pedestal and surrounding said portion of the first mentioned clamping means for removably clamping the movable feet in either of their positions of adjustment.

2. A tripod as claimed in claim 1 in which the inner ends of the movable supports are ring shaped, and in which the adjustable engaging and clamping means includes a tubular exteriorly threaded wing nut adjustably engageable with the internal threads at the lower end of the pedestal and having an exterior annular shoulder for supporting the ring shaped inner ends of the movable feet and for clamping the latter against the lower edge of the pedestal.

3. A tripod as claimed in claim 1 in which the upper end of the pedestal is provided with an inturned flange forming a socket, a ball receivable in the socket and forming part of the means for attachment to the photographic apparatus, and the means for clamping the ball of the attaching means including a bearing ring engaging the lower surface of the ball, and a clamping screw having the outer end enlarged and exteriorly threaded for engagement with the internally threaded body for clamping the bearing ring against the ball.

4. A tripod as claimed in claim 2 in which the upper end of the pedestal is provided with an inturned flange to form a socket, a ball therein forming part of the attaching means, a bearing ring for contacting the ball, and an elongated set screw having the outer end enlarged and threaded and engaged with the threads in the body for clamping the ball and ring in position, said elongated screw including a shank arranged through the tubular wing nut and having detachable wings of less radius than the wings of the tubular wing nuts and nesting within the wings of the tubular wing nut.

5. A tripod as claimed in claim 1 in which at least one of the supporting feet is formed internally and vertically of the outer surface of the pedestal and extends radially and slightly downward therefrom.

ALFRED G. EPPRECHT.

REFERENCES CITED

The following references are of record in the file of this patent:

UNITED STATES PATENTS

| Number | Name | Date |
|---|---|---|
| 357,299 | Wright | Feb. 8, 1887 |
| 654,051 | Brown et al. | July 17, 1900 |
| 2,188,237 | Weaver | Jan. 23, 1940 |
| 2,332,504 | Brenner | Oct. 26, 1943 |

FOREIGN PATENTS

| Number | Country | Date |
|---|---|---|
| 10,310 | Great Britain | June 19, 1902 |